US009066212B2

(12) United States Patent
Shuman et al.

(10) Patent No.: US 9,066,212 B2
(45) Date of Patent: Jun. 23, 2015

(54) OFFLOADING CALL PROCESSING AND CALL HOSTING FOR A SMALL GROUP CALL TO A CLIENT DEVICE

(71) Applicant: QUALCOMM Incorporated, San Diego, CA (US)

(72) Inventors: Mohammed Ataur R. Shuman, San Diego, CA (US); Amit Goel, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/663,625

(22) Filed: Oct. 30, 2012

(65) Prior Publication Data
US 2014/0120889 A1 May 1, 2014

(51) Int. Cl.
*H04M 3/42* (2006.01)
*H04W 4/10* (2009.01)
*H04W 76/00* (2009.01)
*H04W 84/18* (2009.01)
*H04W 4/08* (2009.01)

(52) U.S. Cl.
CPC .............. *H04W 4/10* (2013.01); *H04W 76/005* (2013.01); *H04W 84/18* (2013.01); *H04W 4/08* (2013.01)

(58) Field of Classification Search
CPC ..... H04W 4/10; H04W 84/18; H04W 76/005; H04W 4/08
USPC ................ 370/389, 400, 406; 455/414.1–417
See application file for complete search history.

(56) References Cited

U.S. PATENT DOCUMENTS

| 5,220,593 | A | * | 6/1993 | Zicker et al. ................... 455/407 |
| 7,757,019 | B2 | | 7/2010 | Husemann et al. |
| 8,065,361 | B2 | | 11/2011 | Runstedler et al. |
| 8,094,647 | B2 | | 1/2012 | Elliott et al. |
| 2003/0153340 | A1 | | 8/2003 | Crockett et al. |
| 2003/0153341 | A1 | | 8/2003 | Crockett et al. |
| 2003/0154249 | A1 | * | 8/2003 | Crockett et al. ............. 709/204 |
| 2004/0028199 | A1 | * | 2/2004 | Carlson ...................... 379/93.21 |
| 2004/0077358 | A1 | | 4/2004 | Bennett et al. |
| 2005/0227722 | A1 | | 10/2005 | Harris et al. |
| 2008/0318610 | A1 | | 12/2008 | Bhaskaran et al. |
| 2009/0323655 | A1 | * | 12/2009 | Cardona et al. .............. 370/338 |
| 2010/0313050 | A1 | * | 12/2010 | Harrat et al. .................. 713/323 |
| 2012/0009915 | A1 | * | 1/2012 | Goel et al. ................. 455/422.1 |
| 2012/0106658 | A1 | * | 5/2012 | Muth et al. .................... 375/259 |

(Continued)

OTHER PUBLICATIONS

IEEE 802.16j Standard for Local and metropolitan area networks Part 16: Air Interface for Broadband Wireless Access Systems Amendment 1: Multi Hop Relay Specification, hereinafter 802.16j.*

(Continued)

*Primary Examiner* — Ronald Eisner
(74) *Attorney, Agent, or Firm* — Raphael Freiwirth

(57) ABSTRACT

The disclosure relates to hosting a group call at a wireless user device. An embodiment receives, by the wireless user device, registration information for a plurality of client devices, receives, by the wireless user device, a call request for a call among two or more of the plurality of client devices, sets up, by the wireless user device, the call among the two or more client devices, receives, by the wireless user device, a media stream, and transmits, by the wireless user device, the media stream to at least one of the two or more client devices.

51 Claims, 13 Drawing Sheets

(56) References Cited

U.S. PATENT DOCUMENTS

2012/0149348 A1\*  6/2012  Patel et al. .................... 455/416
2012/0169836 A1     7/2012  Setlur
2013/0116032 A1\*  5/2013  Lutnick .......................... 463/17

OTHER PUBLICATIONS

International Search Report and Written Opinion—PCT/US2013/067005—ISA/EPO—May 13, 2014.

\* cited by examiner

1X EV-DO EXAMPLE

UMTS / W-CDMA EXAMPLE #1

UMTS / W-CDMA EXAMPLE #2

LTE EXAMPLE eHRPD EXAMPLE

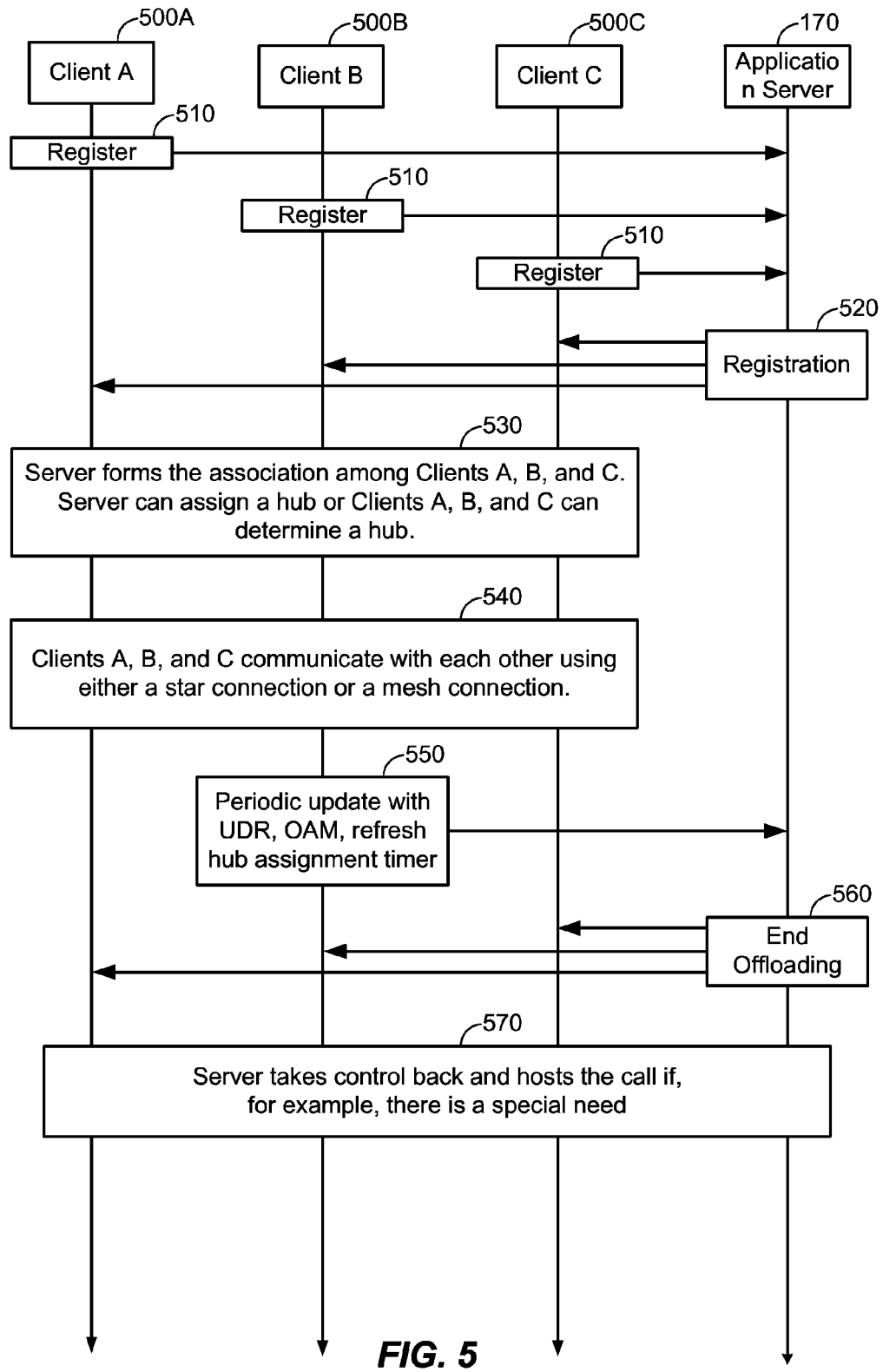

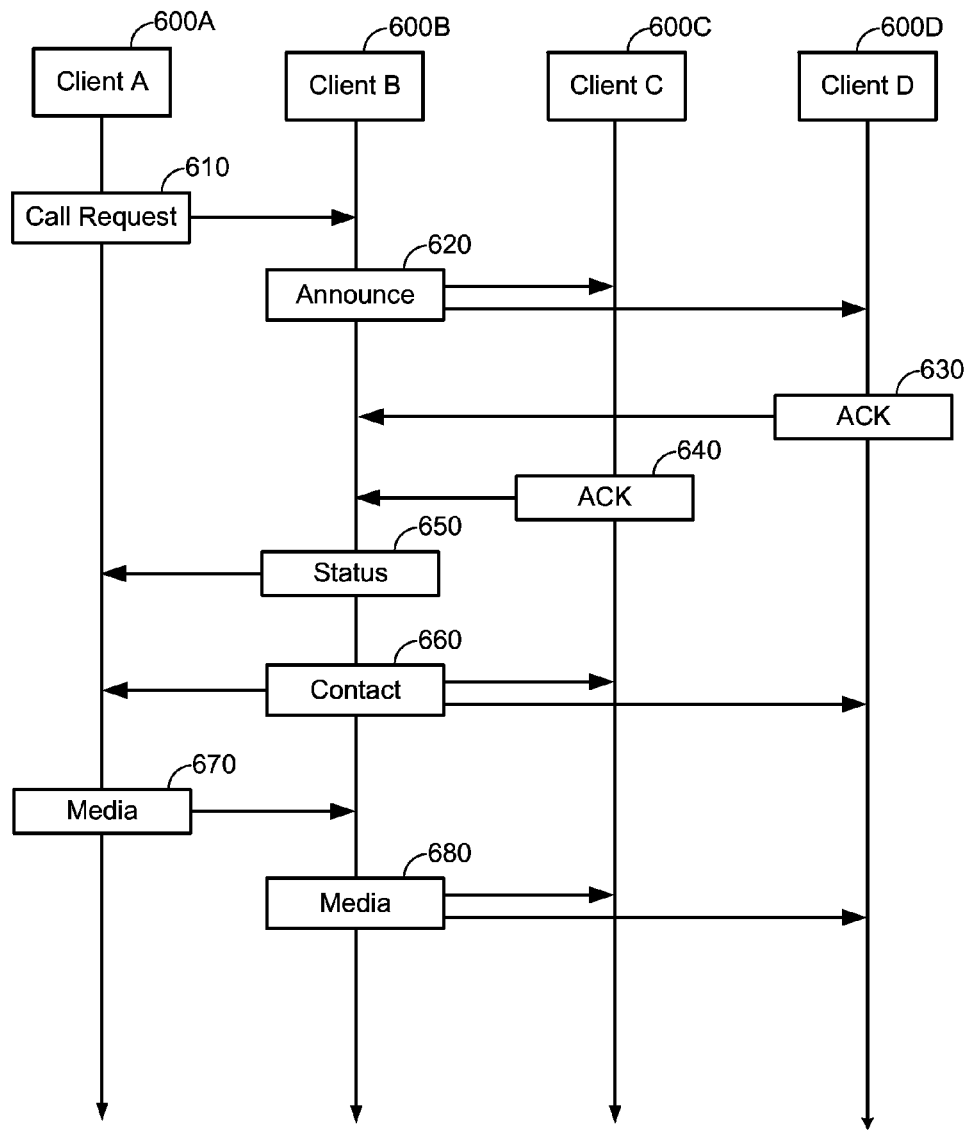
FIG. 6 – STAR CONNECTION EXAMPLE

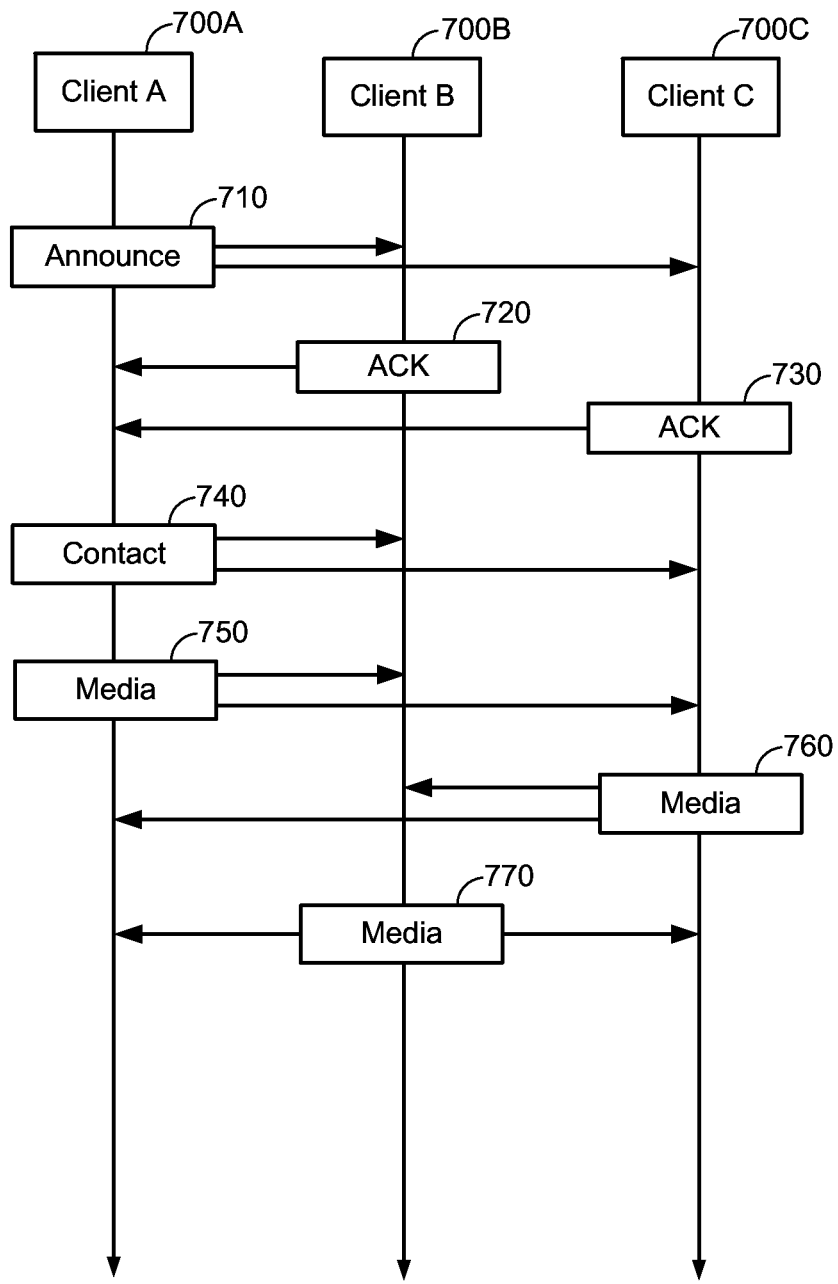
*FIG. 7 – MESH CONNECTION EXAMPLE*

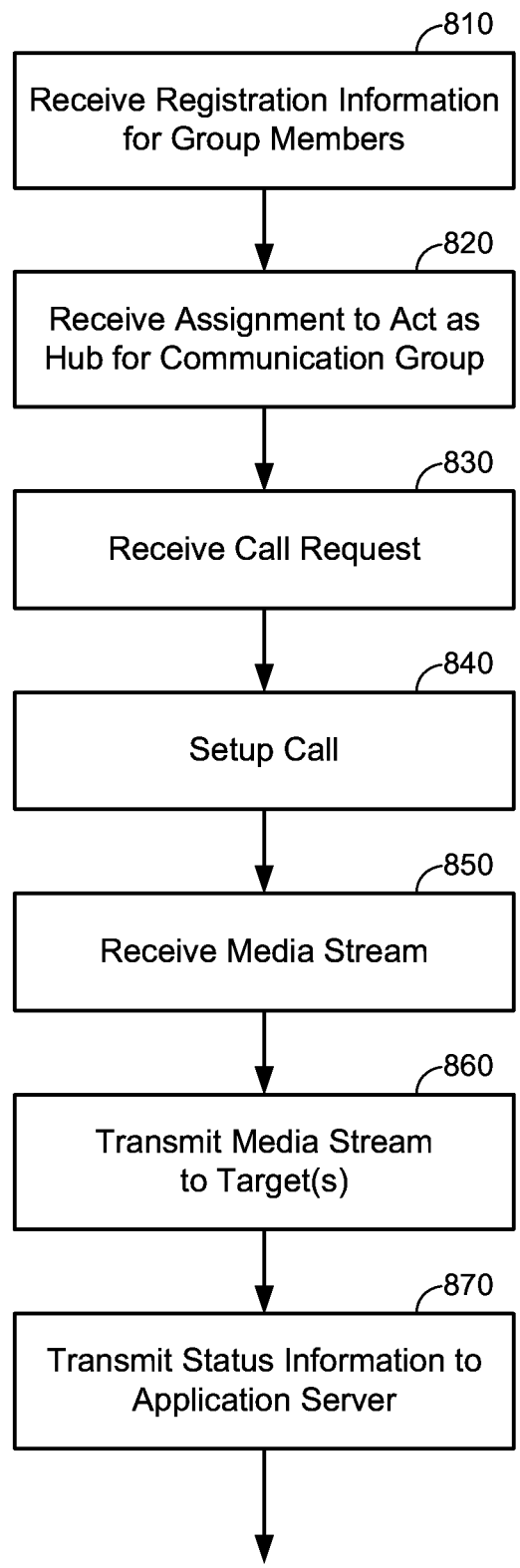
FIG. 8 – HUB PROCESSING

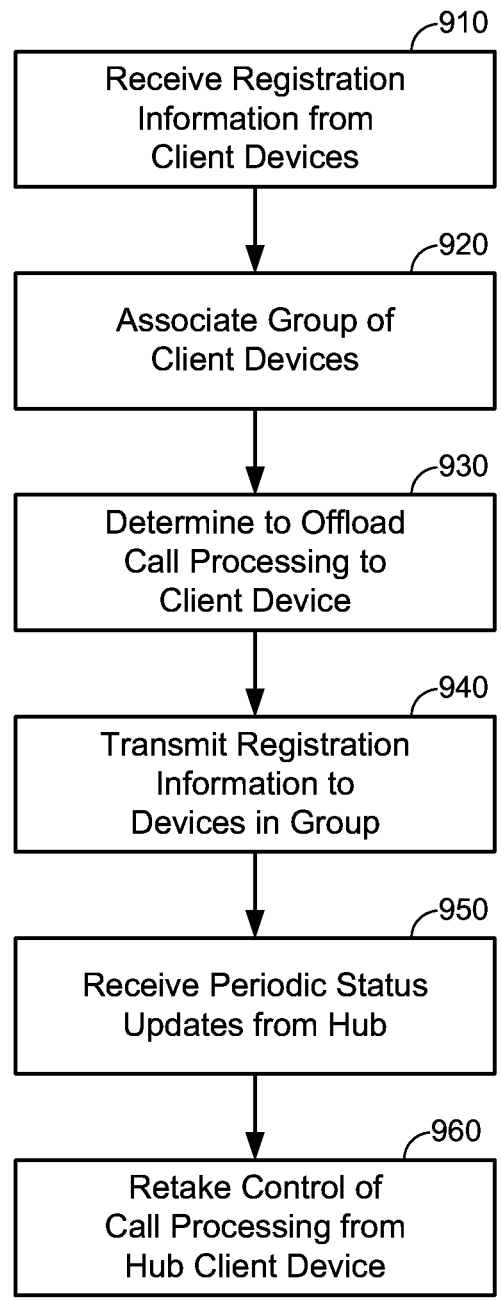
*FIG. 9 – APPLICATION SERVER PROCESSING*

OFFLOADING CALL PROCESSING AND CALL HOSTING FOR A SMALL GROUP CALL TO A CLIENT DEVICE

BACKGROUND OF THE INVENTION

1. Field of the Invention

The disclosure is directed to dynamically offloading call processing and call hosting for a small group call to a client device.

2. Description of the Related Art

Wireless communication systems have developed through various generations, including a first-generation analog wireless phone service (1G), a second-generation (2G) digital wireless phone service (including interim 2.5G and 2.75G networks), and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

There are currently two major ways to deliver voice services using voice over internet protocol (VoIP): the centralized client-server model and the peer-to-peer (P2P) model. The centralized client-server model is the traditional system. An application layer server and various core components are required to provide instantaneous communication services for group calls and direct calls. Relying on a server for such communication has three major issues, however: cost, scalability, and complexity.

P2P systems include both pure P2P and hybrid models. The P2P model addresses some of the drawbacks of the client-server model, such as cost, scalability, and complexity. However, P2P systems do not provide many of the advantages of the client-server model. For instance, current P2P systems do not address all of the telecom carrier's needs, such as secure user authentication, security, Communications Assistance for Law Enforcement Act (CALEA) compliance, recording usage, provisioning, etc. Further, because media flows from peer to peer, it provides challenges for inter-operability (i.e. transcoding needs), conferencing (i.e. mixing needs), etc.

SUMMARY

The disclosure relates to hosting a group call at a wireless user device. An embodiment receives, by the wireless user device, registration information for a plurality of client devices, receives, by the wireless user device, a call request for a call among two or more of the plurality of client devices, sets up, by the wireless user device, the call among the two or more client devices, receives, by the wireless user device, a media stream, and transmits, by the wireless user device, the media stream to at least one of the two or more client devices.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 5 illustrates an exemplary flow of an embodiment in which the server offloads certain server functionality onto a client device.

FIG. 6 illustrates an exemplary call flow for a star connection.

FIG. 7 illustrates an exemplary call flow for a mesh connection.

FIG. 8 illustrates an exemplary flow of an embodiment performed at a client device.

FIG. 9 illustrates an exemplary flow of an embodiment performed at an application server.

DETAILED DESCRIPTION

Figure 1:
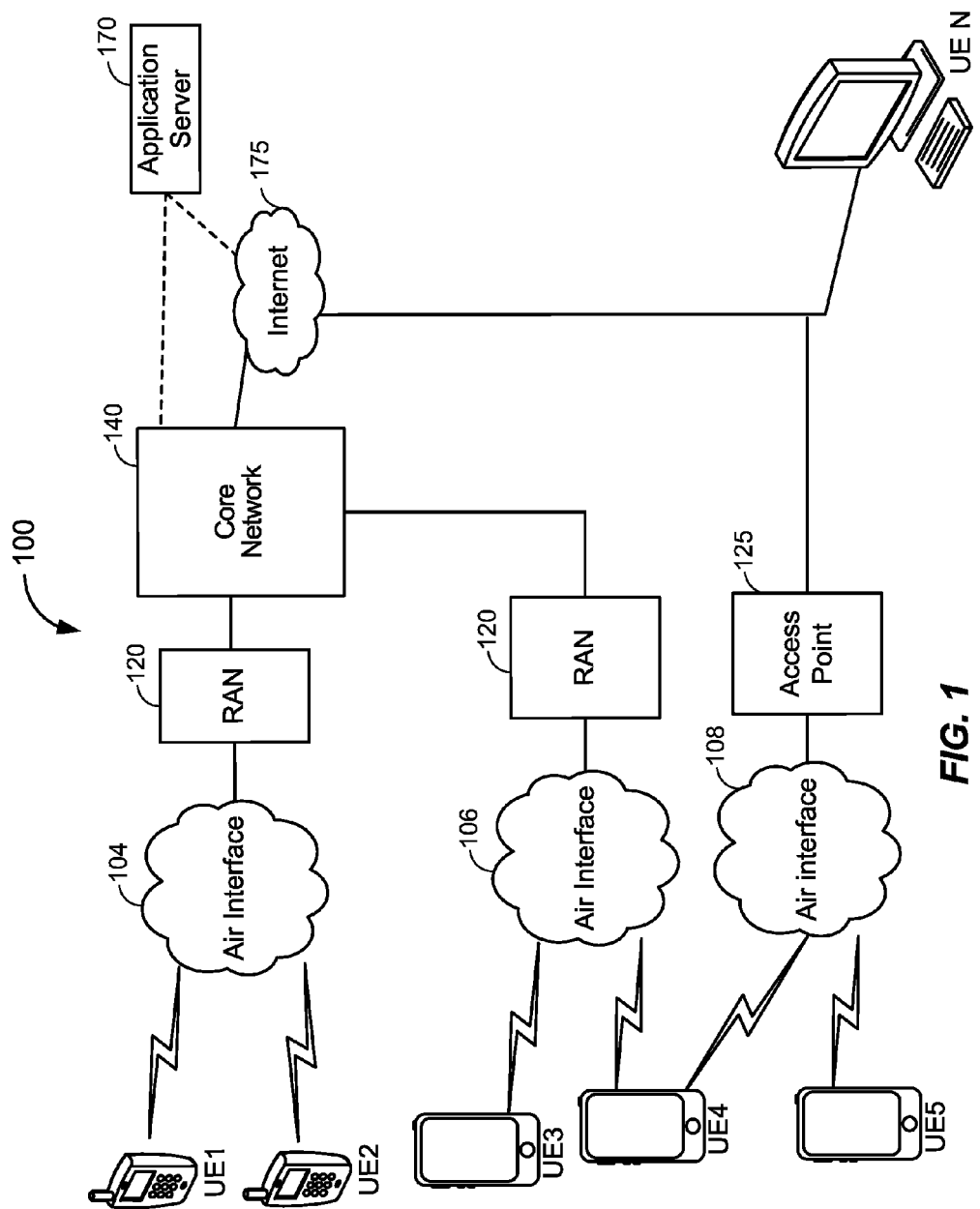
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WI-FI® networks (e.g., wireless local area networks based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an ETHERNET® connection of a WI-FI® or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WI-FI® router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
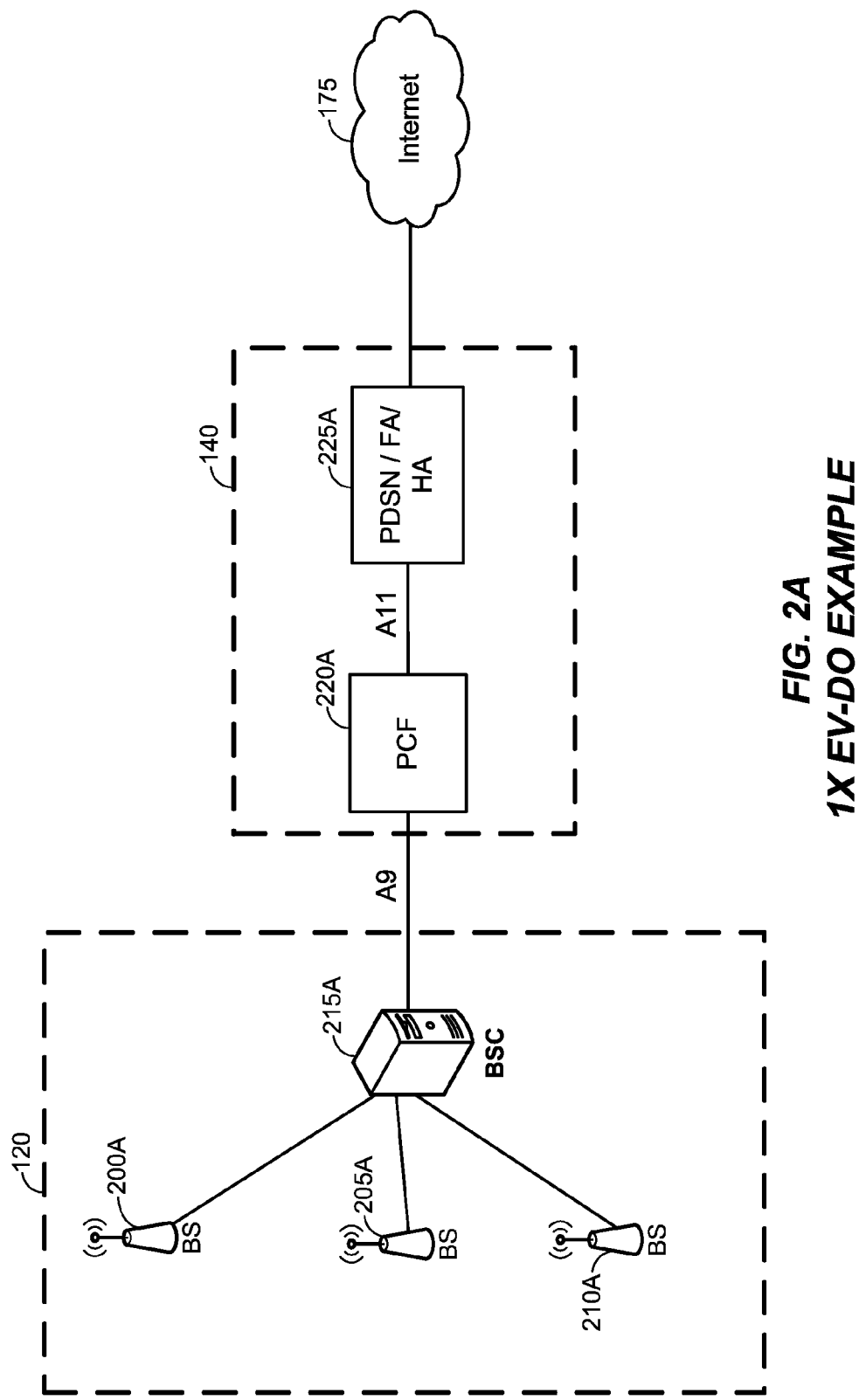
FIG. 2A illustrates an example configuration of a radio access network (RAN) and a packet-switched portion of a core network for a 1x EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
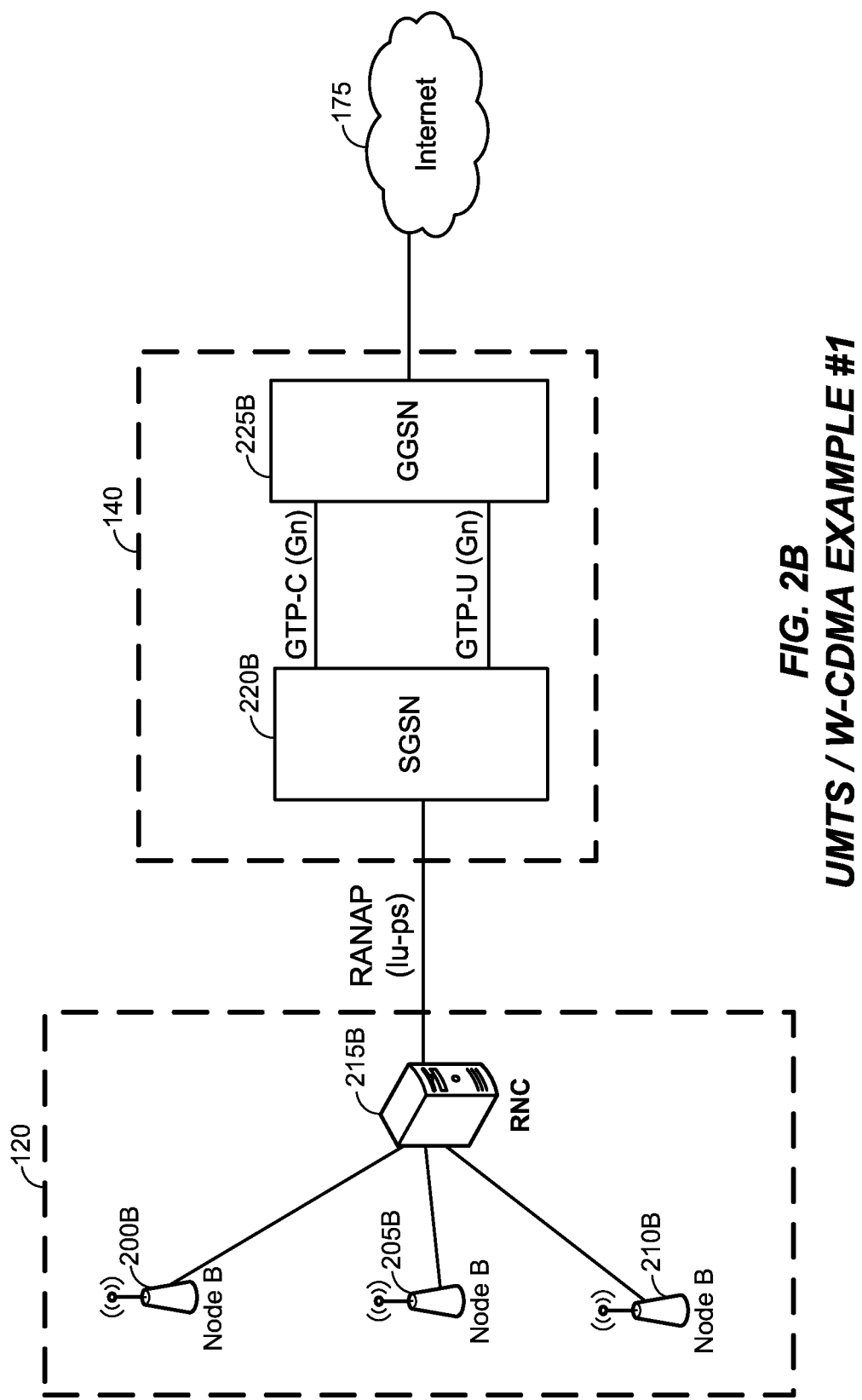
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
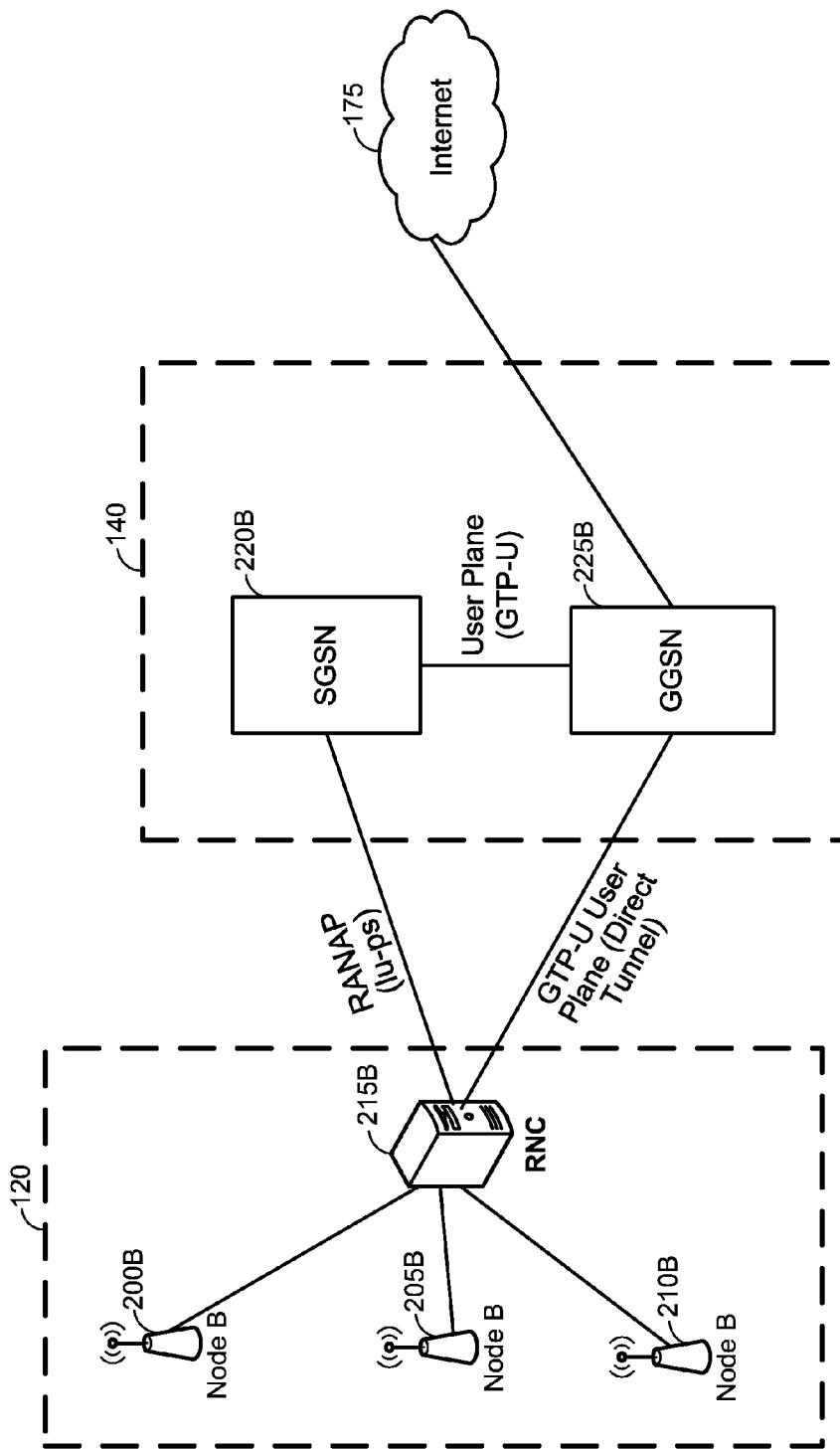
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel When the RAB assigned for a PDP context is released (i.e. the PDP context is preserved) the GTP-U tunnel is established between the GGSN 225B and SGSN 220B in order to be able to handle the downlink packets.

Figure 2D:
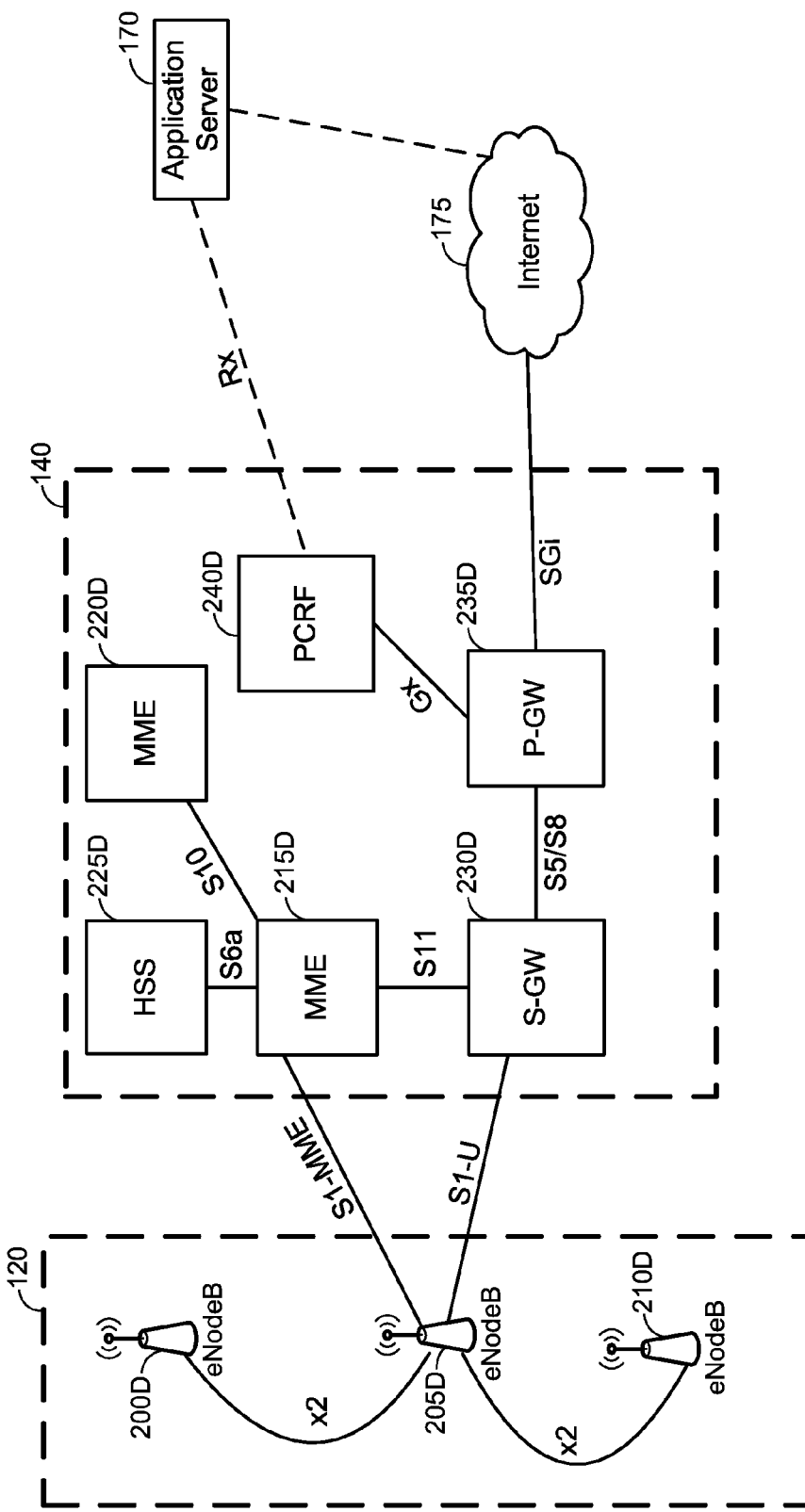
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMES) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
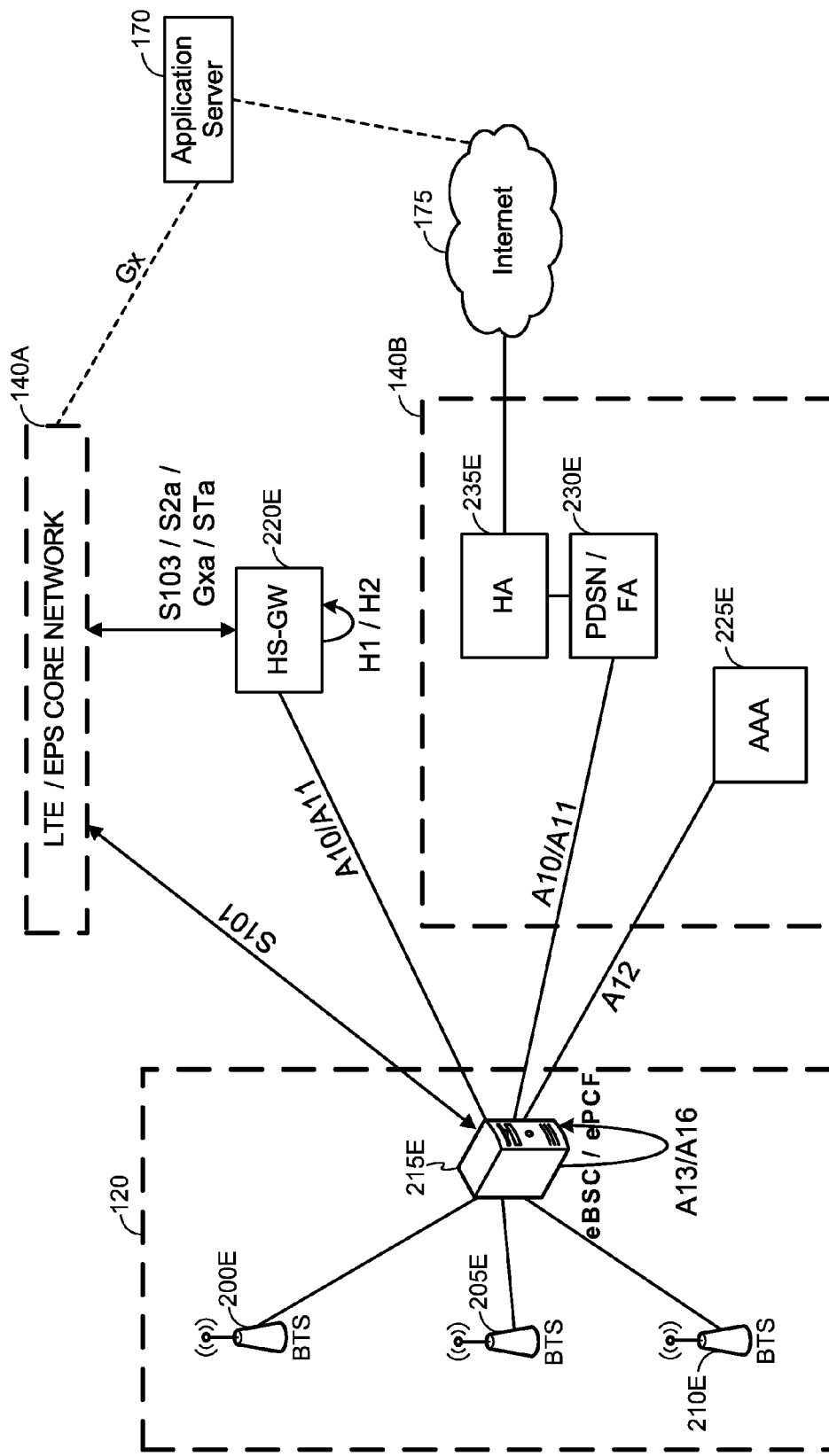
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D of FIG. 2D within the LTE/EPS core network 140A over an S101 interface, and to an HRPD serving gateway (HSGW) 220E over A10 and/or A11 interfaces for interfacing with other entities in the LTE/EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPS/LTE networks that is not available in legacy HRPD networks.

Turning back to the eHRPD RAN, in addition to interfacing with the EPS/LTE core network 140A, the eHRPD RAN can also interface with legacy HRPD networks such as HRPD core network 140B. As will be appreciated the HRPD core network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
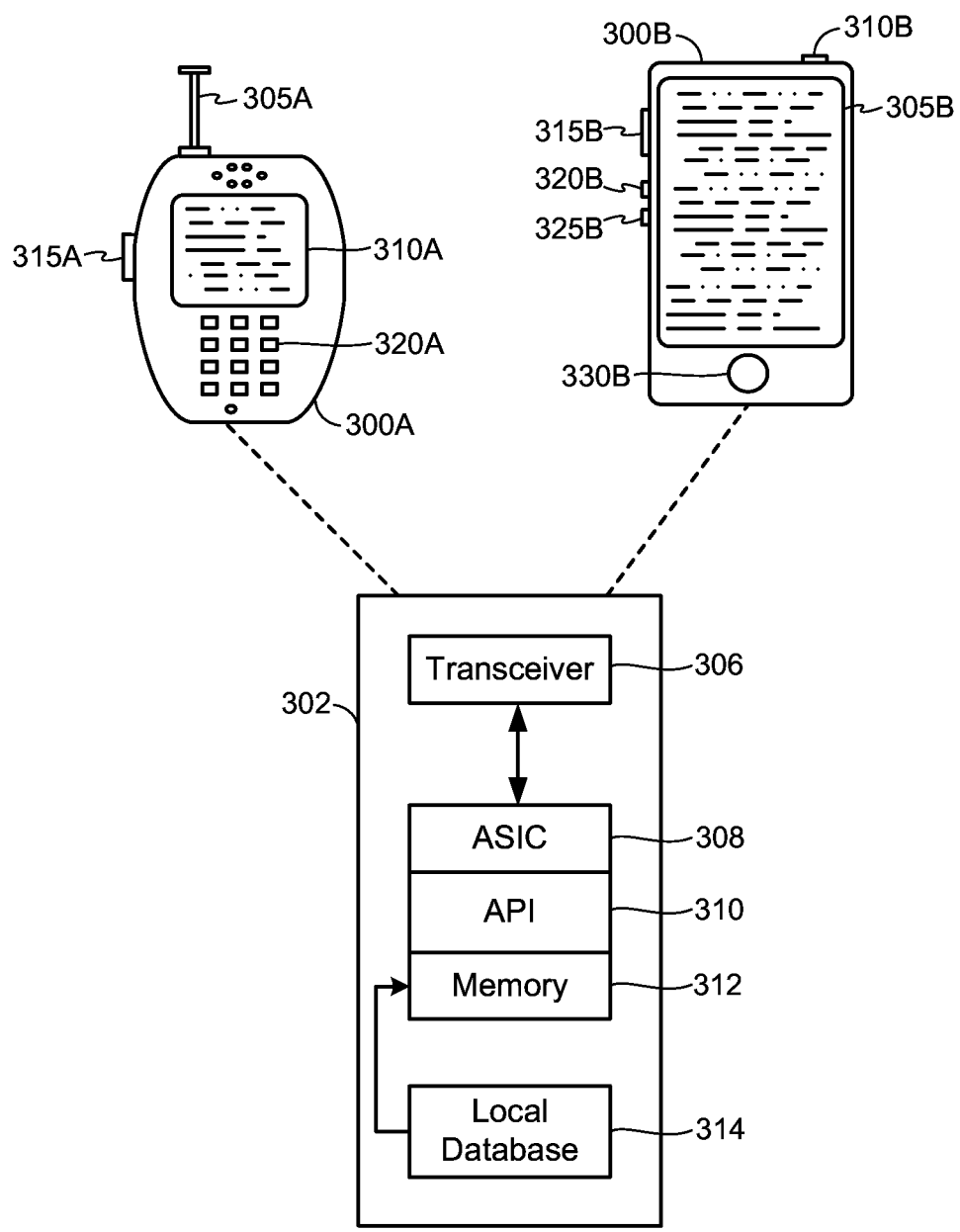
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WI-FI® antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
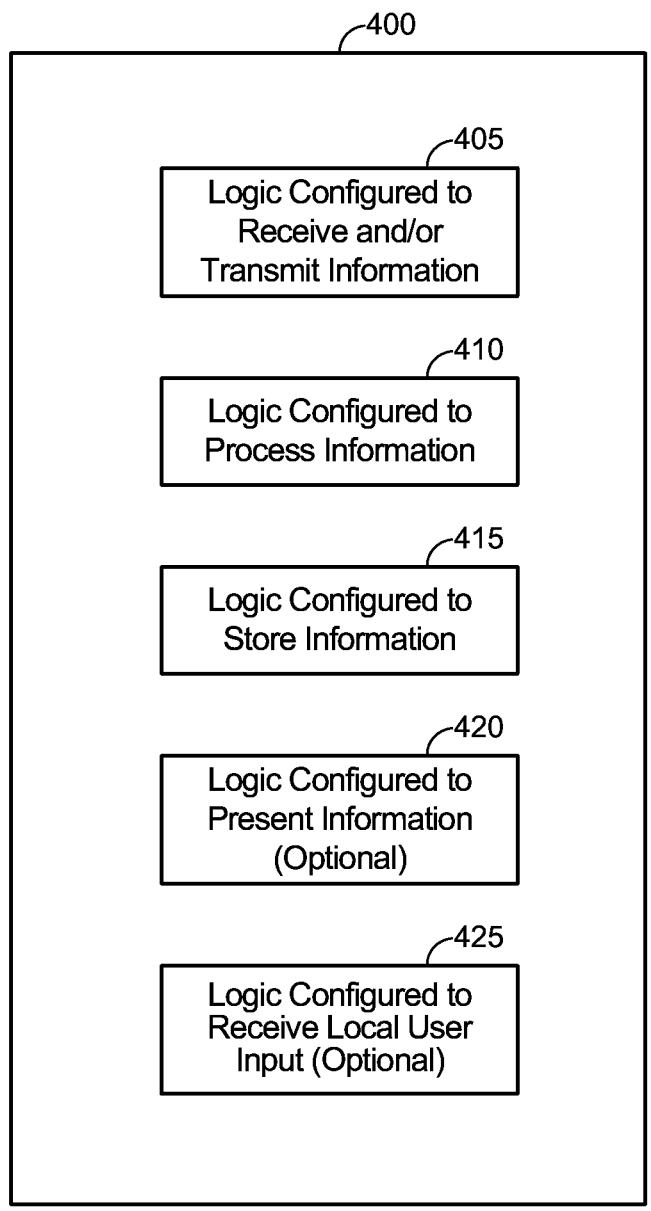
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., BLUETOOTH®, WI-FI®, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an ETHERNET® connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an ETHERNET® card, in an example, that connects the network-based server to other communication entities via an ETHERNET® protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

There are currently two major ways to deliver voice services using voice over internet protocol (VoIP): the centralized client-server model and the peer-to-peer (P2P) model. The centralized client-server model is the traditional system. An application layer server and various core components are required to provide instantaneous communication services for group calls and direct calls. Relying on a server for such communication has three major issues, however:

1. Cost: There is a high cost associated with using a server, such as the cost of the initial deployment and subsequent maintenance. Further, in order to enhance the reliability of the server, the cost of deployment necessarily increases.

2. Scalability: As the number of subscribers increases, the number of servers must increase. Additionally, the servers need to be able to handle load spikes. That is, the servers need to be scalable to support call processing during periods of high traffic volume, even though most of the time the average load is much less.

3. Complexity: Servers require a number of subcomponents and inter-component interfaces to handle call setup and hosting. Servers also require complex messaging on the client-server interface in order to maintain the call state on the server components. The call state is in turn derived from and dependent on the state of the client.

Despite the drawbacks, there are a number of reasons to use a server for call hosting. For call setup, the server can authenticate the originator, lookup the group definition, lookup the target IP addresses, and check the call capability and restrictions. For call hosting, the server can replicate the media streams for each target. For Communications Assistance for Law Enforcement Act (CALEA) compliance, the server can enforce the opaque marking and media forwarding requirements. For billing, the operator can use the usage records from the server to bill the end user. For operations, administration, and management (OAM), the server can provide performance metrics and troubleshooting capability to the operator. For provisioning, the server can provide the operator with the ability to update the provisioning, such as by changing call restrictions and enabling/disabling call type capability.

P2P systems include both pure P2P and hybrid models. The P2P model addresses some of the drawbacks of the client-server model, such as cost, scalability, and complexity. However, P2P systems do not provide many of the advantages of the client-server model. For instance, current P2P systems do not address all of the telecom carrier's needs, such as secure user authentication, security, CALEA compliance, recording usage, provisioning, etc. Further, because media flows from peer to peer, it provides challenges for inter-operability (i.e. transcoding needs), conferencing (i.e. mixing needs), etc.

Regarding security in a P2P system, in a super node network, such as Skype®, one device becomes a super node without permission of the owner of the device. This model does not work for a mobile device, and as such, most of the devices may not be able to serve as the super node.

Finally, it is difficult to provide auxiliary services in a P2P system, such as CALEA compliance, billing, and provisioning. These limitations of the current P2P systems (both pure and hybrid models) do not make it suitable for carrier-grade telecom services.

Usually, cell phone users repeatedly interact with a small number of people. Relying on a server for such communications is an unnecessary use of costly server resources. Accordingly, the various embodiments provide a solution whereby a centralized server is not needed at all times to provide efficient group communication for calls among a small group of subscribers. A "small" group of subscribers may be, for example, two to five subscribers. However, as cell phone technology improves, the number of subscribers would necessarily increase, and the various embodiments are not limited to a particular number of subscribers in a group.

The various embodiments are not a traditional P2P solution. The various embodiments employ the traditional centralized client-server model but with the server dynamically offloading certain types of communications while still performing all other necessary functionality. Specifically, the server dynamically offloads call processing and call hosting to a client device (called the "hub") among the small group of client devices and retains control of all other server functionality for that group. The server may offload these service during times of high traffic volume, when traffic volume reaches a threshold, on a call-by-call basis, or whenever possible.

The server can use certain associations among client devices to decide how, when, and to what client device to offload the call processing and call hosting. For example, the server may determine that a group of five subscribers call each other more frequently than they call anyone else. The calls may be direct calls from one subscriber to another or group calls among a plurality of the subscribers. Accordingly, the server will associate the five subscribers. The server may store this association as a table or some other data structure that relates elements to each other.

Having identified a group/association of subscribers, the server can offload simple services, such as call processing and call hosting, to the group. A client device of a member of the group administers call setup, management, and media delivery on an ad hoc basis for calls among the group. This is feasible now with the increased processing power of current generation cell phones and the availability of the 3G/4G/WI-FI®, data bandwidth. The server automatically takes control back from the client for advanced services, such as services that require transcoding, inter-operability, mixing, etc.

Accordingly, the various embodiments extend the server ability to a client device, while the server remains in control and provides all the auxiliary services for the calls such as CALEA, billing, provisioning, security, authentication, etc. There are a number of main design points:

1. Registration: Registration information for the designated/associated group members is available to the hub client device. The registration information can come from the application server or each member of the call can send the registration information to the hub client.

2. Synchronization between the server and hub: The server may optionally send an indication to the client devices in the group (based on load, time, etc.) to use the client-based solution to setup the call for a specific group call. In this situation, there will be a "time to live" time of, for example, six to twelve hours, after which, if the hub or all the group member devices cannot communicate with the server, the group call setup functionality is stopped at the hub client. The server remains aware of the mobile group, and any time there is any change in the provisioning, the server will update the hub or all the group member devices.

The server also provides distributed offloading of the provisioning. Specifically, upon a hub-server synchronization, provisioning information for all devices served by the hub is passed to the hub. The hub then distributes the provisioning payload to the individual member devices during a subsequent group call/direct call(s). This offloads several one-to-one provisioning transactions between the server and the group devices to relatively fewer segregated provisioning transactions between the server and the hub device. This is eventually followed by calls piggybacked with provisioning content.

3. Partial offloading to the hub: The server may optionally offload only the media forwarding functionality to the hub device, while the server continues to provide call setup signaling.

4. Dynamic change of the designated hub: Initially, the call originator can act as the controller of the call or the server may designate a hub. However, once the call is established, any other member can take control based on the client device's capability, battery power situation, memory, processing capability (which varies with application and operating system load), socket(s) availability, radio frequency (RF) condition, etc. For example, if the hub device finds that its power status is low, it may send a request to the group that another member take over the call. Key capability metrics (KCMs) of the device are used to ascertain eligibility for taking over as a hub.

The KCMs can be used for dynamic hub ranking and arbitration. That is, if two devices are similar in hub capabilities, a ranking algorithm can be employed to ascertain whether a dynamic switch should take place as a result of a KCM change. For example, given two similarly capable devices eligible for being the hub, if one device is put on a charger, the KCM of this device would be higher than the other eligible device. The ranking algorithm could consider the following metrics in descending order: a) processing resources (e.g. CPU, memory), b) power availability or mode (a device may be low on power but if charging will score a higher KCM), c) RF bandwidth (wireless local area network (WLAN) bandwidth is typically greater than wireless wide area network (WWAN) bandwidth, but when larger group calls are to be hosted, LTE would be preferable over a slower WLAN.

Each device in the group can report its KCM to determine whether another device should be the hub. Specifically, the hub and associated devices can have an intermittent "hub-state" handshake message indicating their KCM for hub eligibility and switching. This can be a localized algorithm on the current hub, whereby hub-eligible devices report their own KCM to the hub. When the current hub cannot sustain operations, it initiates a hub handoff. The hub handoff can also be reported to the server. It is possible that occasionally no device would be eligible or available to be the hub. In such a case, a hub handoff would indicate the server as the next hub. Hub handoffs can include immediate or deferred posting of usage records to the server.

5. Reliability: In case of failure or no response from the other device(s), the hub client will seamlessly contact the server.

6. CALEA: If one or more of the clients in the group of offloaded clients are marked by a law enforcement agency, the server will reliably send update information to all the offloaded client devices, which will deactivate the client-based approach and setup the call using the application server.

7. Billing and OAM: The hub client caches the call records and during off-peak times sends the usage and OAM records to the server out-of-band.

FIG. 5 illustrates an exemplary flow of an embodiment in which the server offloads certain server functionality onto a client device (the "hub"). At 510, client A 500A, client B 500B, and client C 500C register with the application server 170. At 520, the application server 170 sends this registration information to each client.

At 530, the application server 170 forms an association among client A 500A, client B 500B, and client C 500C. The application server 170 forms this association because it has determined that client A 500A, client B 500B, and client C 500C frequently communicate with each other, in group calls and/or directly.

After forming the group association, a client device in the associated group is dynamically assigned as the hub. The application server 170 may assign one of the client devices as the hub randomly or based on various criteria, such as the client device with the best KCMs, the client device most likely to initiate a call, etc. Alternatively, the group member devices can determine the hub. The hub could be the client device initiating a call or the client device with the best KCMs. At 540, the clients communicate with each other using either a star connection or a mesh connection.

At 550, the hub, client 500B in the example of FIG. 5, sends periodic updates to the application server 170. These updates can include the usage data records (UDR) and OAM information. These updates also refresh the hub assignment timer. The hub assignment timer tracks the amount of time since the hub last communicated with the server. This is useful for determining whether the group has exceeded its "time to live."

At 560, the application server 170 ends the offloading of server functionality to the communication group. This may be at the expiration of a timer, because the load on the application server 170 decreases below a threshold, or, as in 570, due to some special need. For example, for CALEA interceptions, the application server 170 would take back control of the call from the hub device.

There are two different ways a client device can act as the hub (i.e. as a server), a star connection and a mesh connection. The server may instruct the group to use a star connection or a mesh connection, or the client devices in the group may determine which to use. In a star connection, the server or client devices can dynamically designate a specific device (the hub device) to manage the communications among the group, as discussed above. The hub device maintains the call registration and is able to setup, host (i.e. provide processing resources), and manage the call. The hub device need not be a member of the call.

In a star connection, the registration information of each group member is available to all of the group members, including the hub device. Call setup and hosting occurs in the same way as in a server based system, except that the hub device is used instead of the server. This model is transparent to the end user, i.e. the end user does not know if the call is hosted on a hub device or the server. For CALEA interceptions and the like, the hub is removed from the group and the group members are updated with the server's address for call setup and hosting.

FIG. 6 illustrates an exemplary call flow for a star connection. In the example of FIG. 6, the application server has formed an association (as in 530 of FIG. 5) among client A 600A, client B 600B, client C 600C, and client D 600D, and client B 600B has been designated as the hub, either by the server or the client devices. At 610, client A 600A sends a call request to client B 600B. The call request may be for a direct call to one of the other client devices or for a group call among a plurality of the client devices. In the example of FIG. 6, the call request may be for a group call among client devices A-D 600A-D, or only client devices A 600A, C 600C, and D 600D.

At 620, client B 600B sends a call announcement to client C 600C and client D 600D. At 630, client D 600D acknowledges the call announcement by sending an "ACK" message to client B 600B. At 640, client C 600C acknowledges the call announcement in the same way. At 650, client B 600B sends a status message to client A 600A, indicating that clients C 600C and D 600D have acknowledged the call announcement.

At 660, client B 600B contacts the other client devices to begin the group call. At 670, client A 600A transmits media to client B 600B. The media may be audio, video, and/or opaque data, as is typical in a group communication. At 680, client B 600B forwards the media to clients C 600C and D 600D.

As can be seen in FIG. 6, the call processing and call hosting is the same as if an application server were processing and hosting the call. Each client device simply has the address of the hub device instead of the server. Any communications that would be sent to the server are instead sent directly to the client device acting as the hub.

In the second way a client device can act as the hub, a mesh connection, each member of the communication group maintains the registration information for the other members. The client originating a call acts as the initial hub for the call. Specifically, the originating client directly pages all the member clients, and when the call is setup, it sends the voice packets to each of the clients. As with a star connection, this model is transparent to the end user, i.e. the end user does not know if the call is hosted on a hub device or the server. For CALEA interceptions and the like, the server transmits the opaque marker configuration of the client, and without the knowledge of the end user, if the user is marked, the signaling and media stream is also sent to the intercept server.

FIG. 7 illustrates an exemplary call flow for a mesh connection. In the example of FIG. 7, the application server has formed an association (as in 530 of FIG. 5) among client A 700A, client B 700B, and client C 700C. In a mesh connection, there is no pre-designated hub. Rather, a client device initiating a call acts as the hub. However, after the call is initiated, the originator/hub can pass the hub responsibilities to another client device in the group.

In the example of FIG. 7, client A 700A wishes to initiate a call among the group members. The call could be a direct call to one of the other client devices or a group call, such as a PTT call, among a plurality of the client devices. Here, it is a group call among all the client devices. Accordingly, at 710, client A 700A sends a call announcement to client B 700B and client C 700C. At 720, client B 700B acknowledges the call announcement by sending an "ACK" message to client A 700A. At 730, client C 700C acknowledges the call announcement in the same way.

At 740, client A 700A contacts the other client devices to begin the group call. At 750, client A 700A transmits media to client B 700B and client C 700C. The media may be a talk spurt comprising audio, video, and/or opaque data, as is typical in a group communication.

Up to this point, call processing and call hosting are the same as if an application server were processing and hosting the call. Each client device simply has the address of the hub/call originator instead of the server. Any communications that would be sent to the server are instead sent directly to the client device acting as the hub. This changes when other client devices wish to transmit media during the group communication. Since each client has the registration information of all the other clients, a client can transmit media directly to the other clients, rather than route the media through the hub.

Referring to FIG. 7, the user of client C 700C wishes to transmit media during the group call. Accordingly, at 760, client C 700C transmits the media directly to client A 700A and client B 700B, rather than routing the media through client A 700A. Similarly, at 770, client B 700B transmits media directly to client A 700A and client C 700C, rather than routing the media through client A 700A.

FIG. 8 illustrates an exemplary flow of an embodiment performed at a client device. At this point, the application server has associated various client devices into a communications group and has determined to offload server functionality to a client device in the group. At 810, the client device receives registration information for each member of the communication group.

At 820, the client device receives an assignment to act as the hub for the communications group. As discussed above, the client device can receive the assignment from the application server, the communication group can determine which client device would be the best hub (e.g. based on KCMs of the client devices), or the client device may be initiating the call (as in a mesh connection).

At 830, the client device receives a call request. The call request may come from another client device in the group or from a user of the hub client device. At 840, the hub client device sets up the call. This includes sending a call announcement to the target(s) of the call, receiving acknowledgment(s) from the target(s), etc.

At 850, after the call has been setup, the hub device receives a media stream containing call data, such as audio, video, and/or opaque data. The hub device may receive the media stream from the client device that initiated the call or the user of the hub client device. At 860, the hub device transmits the media stream to the target(s) on the call.

At 870, the hub client device transmits status information to the application server. As discussed above, these updates can include the UDR and OAM information, and result in refreshing the hub assignment timer.

FIG. 9 illustrates an exemplary flow of an embodiment performed at an application server. At 910, the application server receives registration information from the client devices that it serves. At 920, the application server identifies associations among the client devices and forms communications groups based on these associations. These associations can be identified by searching for small groups of subscribers that frequently communicate with each other, either directly or in group communications, such as PTT calls.

At 930, the application server determines to offload call processing and call hosting to a communications group. The application server can make this determination based on the time of day, i.e. peak or off-peak, the current load on the application server, the capability of client devices within the group, etc.

At 940, the application server transmits the registration information of the members of the communication group to each member of the group. The server may then assign a hub, or the group may determine the hub. The server is informed of the hub assignment and transparently provisions the client devices with the hub's address as the server address. This provisioning may be part of transmitting the registration information to the members.

At this point, the hub device takes over call processing and call hosting. At 950, the application server receives periodic updates from the hub. As discussed above, these updates can include the UDR and OAM information, and result in refreshing the hub assignment timer.

At 960, the application server takes control back from the hub device. Like the determination to offload server functionality to the hub, the application server can make this determination based on the time of day, i.e. peak or off-peak, the current load on the application server, the capability of client devices within the group, the expiration of a timer, etc. The application server may also make this determination based on special circumstances, such as CALEA requirements.

While the embodiments above have been described primarily with reference to 1x EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for hosting a group call at a wireless user device, comprising:
   receiving, by the wireless user device, registration information for a plurality of client devices;
   receiving, by the wireless user device, a call request for a call among two or more of the plurality of client devices;
   setting up, by the wireless user device, the call among the two or more of the plurality of client devices;
   receiving, by the wireless user device, a media stream; and
   transmitting, by the wireless user device, the media stream to at least one of the two or more of the plurality of client devices, wherein the wireless user device receives the registration information for the plurality of client devices based on a server determining to offload call processing for calls among the plurality of client devices to the wireless user device.

2. The method of claim 1, further comprising:
   receiving, by the wireless user device, an assignment to act as a hub for the call.

3. The method of claim 2, wherein the receiving the assignment comprises receiving the assignment from the server, wherein the wireless user device hosts the call instead of the server.

4. The method of claim 2, wherein the receiving the assignment comprises receiving the assignment based on a determination by the plurality of client devices of which of the plurality of client devices has a greatest ability to host the call.

5. The method of claim 4, wherein the determination of which of the plurality of client devices has the greatest ability to host the call is based on a ranking of each of the plurality of client devices.

6. The method of claim 5, wherein the ranking is based on one or more of processing resources, power availability or mode, or available bandwidth.

7. The method of claim 2, wherein the receiving the assignment comprises receiving the assignment from a client device of the plurality of client devices that is currently hosting the call.

8. The method of claim 1, wherein the receiving the registration information comprises receiving the registration information from the server.

9. The method of claim 1, wherein the receiving the registration information comprises receiving the registration information from one or more of the plurality of client devices.

10. The method of claim 1, wherein the setting up the call comprises:
    transmitting, by the wireless user device, a call announcement to the two or more of the plurality of client devices.

11. The method of claim 10, wherein the setting up the call comprises:
    receiving an acknowledgement to the call announcement from the two or more of the plurality of client devices.

12. The method of claim 1, wherein the receiving the call request comprises:
    receiving the call request from one of the plurality of client devices.

13. The method of claim 1, wherein the receiving the call request comprises:
    receiving the call request from a user of the wireless user device.

14. The method of claim 1, wherein the registration information for the plurality of client devices is available to each of the plurality of client devices.

15. The method of claim 1, wherein each of the plurality of client devices is configured to host a call that it originates.

16. The method of claim 1, wherein the media stream is a push-to-talk (PTT) talk spurt.

17. The method of claim 1, wherein the server provides auxiliary services for the call, and wherein the wireless user device hosts the call instead of the server.

18. The method of claim 17, wherein the auxiliary services comprise one or more of Communications Assistance for Law Enforcement Act (CALEA) compliance, billing, provisioning, security, or authentication.

19. The method of claim 1, further comprising:
    transmitting a record of the call to the server during an off-peak time.

20. The method of claim 1, further comprising:
    receiving a timer value from the server, the timer value indicating a time period after which the wireless user device should stop hosting calls based on not being able to communicate with the server.

21. The method of claim 20, wherein the time period is a value from six to twelve hours.

22. The method of claim 1, further comprising:
periodically synchronizing with the server, wherein the wireless user device hosts the call instead of the server.

23. The method of claim 22, wherein the synchronizing comprises:
transmitting values representing usage data records (UDR) and operations, administration, and management (OAM) statistics for the call; and
refreshing a timer value indicating a time period after which the wireless user device should stop hosting calls based on not being able to communicate with the server.

24. The method of claim 1, wherein the wireless user device hosting the group call is transparent to the plurality of client devices.

25. An apparatus for hosting a group call at a wireless user device, comprising:
a processor; and
a memory storing instructions that, when executed by the processor, cause the apparatus to perform operations comprising:
receiving registration information for a plurality of client devices;
receiving a call request for a call among two or more of the plurality of client devices;
setting up the call among the two or more of the plurality of the client devices;
receiving a media stream; and
transmitting the media stream to at least one of the two or more of the plurality of the client devices, wherein said receiving the registration information for the plurality of client devices is based on a server determining to offload call processing for calls among the plurality of client devices to the wireless user device.

26. The apparatus of claim 25, wherein the operations further comprise:
receiving an assignment to act as a hub for the call.

27. The apparatus of claim 26, wherein the receiving the assignment comprises receiving the assignment from the server, wherein the wireless user device hosts the call instead of the server.

28. The apparatus of claim 26, wherein the receiving the assignment comprises receiving the assignment based on a determination by the plurality of client devices of which of the plurality of client devices has a greatest ability to host the call.

29. The apparatus of claim 28, wherein the determination of which of the plurality of client devices has the greatest ability to host the call is based on a ranking of each of the plurality of client devices.

30. The apparatus of claim 29, wherein the ranking is based on one or more of processing resources, power availability or mode, or available bandwidth.

31. The apparatus of claim 26, wherein the receiving the assignment comprises receiving the assignment from a client device of the plurality of client devices that is currently hosting the call.

32. The apparatus of claim 25, wherein the receiving the registration information comprises receiving the registration information from a server.

33. The apparatus of claim 25, wherein the receiving the registration information comprises receiving the registration information from one or more of the plurality of client devices.

34. The apparatus of claim 25, wherein the setting up the call comprises:
transmitting, by the wireless user device, a call announcement to the two or more of the plurality of the client devices.

35. The apparatus of claim 34, wherein the setting up the call comprises:
receiving an acknowledgement to the call announcement from the two or more of the plurality of the client devices.

36. The apparatus of claim 25, wherein the receiving the call request comprises:
receiving the call request from one of the plurality of client devices.

37. The apparatus of claim 25, wherein the receiving the call request comprises:
receiving the call request from a user of the wireless user device.

38. The apparatus of claim 25, wherein the registration information for the plurality of client devices is available to each of the plurality of client devices.

39. The apparatus of claim 25, wherein each of the plurality of client devices is configured to host a call that it originates.

40. The apparatus of claim 25, wherein the media stream is a push-to-talk (PTT) talk spurt.

41. The apparatus of claim 25, wherein the server provides auxiliary services for the call, and wherein the wireless user device hosts the call instead of the server.

42. The apparatus of claim 41, wherein the auxiliary services comprise one or more of Communications Assistance for Law Enforcement Act (CALEA) compliance, billing, provisioning, security, or authentication.

43. The apparatus of claim 25, wherein the operations further comprise:
transmitting a record of the call to the server during an off-peak time.

44. The apparatus of claim 25, wherein the operations further comprise:
receiving a timer value from the server, the timer value indicating a time period after which the wireless user device should stop hosting calls based on not being able to communicate with the server.

45. The apparatus of claim 44, wherein the time period is a value from six to twelve hours.

46. The apparatus of claim 25, wherein the operations further comprise:
periodically synchronizing with the server, wherein the wireless user device hosts the call instead of the server.

47. The apparatus of claim 46, wherein the synchronizing comprises:
transmitting values representing usage data records (UDR) and operations, administration, and management (OAM) statistics for the call; and
refreshing a timer value indicating a time period after which the wireless user device should stop hosting calls based on not being able to communicate with the server.

48. The apparatus of claim 25, wherein the wireless user device hosting the group call is transparent to the plurality of client devices.

49. An apparatus for hosting a group call at a wireless user device, comprising:
logic configured to receive registration information for a plurality of client devices;
logic configured to receive a call request for a call among two or more of the plurality of client devices;
logic configured to setup the call among the two or more of the plurality of the client devices;
logic configured to receive a media stream; and logic configured to transmit the media stream to at least one of the two or more of the plurality of the client devices, wherein said logic is configured to receive the registration information for the plurality of client devices based on a server determining to offload call processing for calls among the plurality of client devices to the wireless user device.

50. An apparatus for hosting a group call at a wireless user device, comprising:
- means for receiving registration information for a plurality of client devices;
- means for receiving a call request for a call among two or more of the plurality of client devices;
- means for setting up the call among the two or more of the plurality of the client devices;
- means for receiving a media stream; and
- means for transmitting the media stream to at least one of the two or more of the plurality of the client devices, wherein said receiving the registration information for the plurality of client devices is based on a server determining to offload call processing for calls among the plurality of client devices to the wireless user device.

51. A non-transitory computer-readable medium for hosting a group call at a wireless user device, comprising:
- at least one instruction for receiving, by the wireless user device, registration information for a plurality of client devices;
- at least one instruction for receiving, by the wireless user device, a call request for a call among two or more of the plurality of client devices;
- at least one instruction for setting up, by the wireless user device, the call among the two or more of the plurality of the client devices;
- at least one instruction for receiving, by the wireless user device, a media stream; and
- at least one instruction for transmitting, by the wireless user device, the media stream to at least one of the two or more of the plurality of the client devices, wherein said receiving, by the wireless user device, the registration information for the plurality of client devices, is based on a server determining to offload call processing for calls among the plurality of client devices to the wireless user device.

* * * * *